(12) United States Patent
Rosko

(10) Patent No.: US 9,734,484 B2
(45) Date of Patent: Aug. 15, 2017

(54) SYSTEM AND METHOD FOR IMPLEMENTING A CONSOLIDATED APPLICATION PROCESS

(75) Inventor: Robert J. Rosko, West Chester, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 86 days.

(21) Appl. No.: 13/587,099

(22) Filed: Aug. 16, 2012

(65) Prior Publication Data

US 2012/0323761 A1    Dec. 20, 2012

Related U.S. Application Data

(63) Continuation of application No. 13/353,589, filed on Jan. 19, 2012, now Pat. No. 8,266,054, which is a continuation of application No. 12/940,186, filed on Nov. 5, 2010, now Pat. No. 8,117,121, which is a continuation of application No. 09/599,602, filed on Jun. 23, 2000, now Pat. No. 7,831,508.

(51) Int. Cl.
  *G06Q 10/10* (2012.01)
  *G06Q 40/02* (2012.01)
  *G06F 17/00* (2006.01)

(52) U.S. Cl.
  CPC .......... *G06Q 10/10* (2013.01); *G06Q 40/025* (2013.01); *G06F 17/60* (2013.01); *G06Q 2220/00* (2013.01)

(58) Field of Classification Search
  CPC .... G06F 17/60; G06Q 10/10; G06Q 2220/00; G06Q 40/25
  USPC .......... 705/27, 26, 44, 27.1, 35, 38; 707/104
  See application file for complete search history.

(56) References Cited

U.S. PATENT DOCUMENTS

| | | |
|---|---|---|
| 3,316,395 A | 4/1967 | Lavin |
| 3,938,091 A | 2/1976 | Atalla et al. |
| 4,321,672 A | 3/1982 | Braun et al. |
| 4,567,359 A | 1/1986 | Lockwood |
| 4,594,663 A | 6/1986 | Nagata et al. |
| 4,633,397 A | 12/1986 | Macco |

(Continued)

FOREIGN PATENT DOCUMENTS

| | | |
|---|---|---|
| WO | WO03003155 | 1/2003 |
| WO | WO2009071188 | 6/2009 |
| WO | WO2011082380 | 7/2011 |

OTHER PUBLICATIONS

U.S. Appl. No. 60/190,825, filed Mar. 21, 2000.

(Continued)

*Primary Examiner* — Daniel Felten
(74) *Attorney, Agent, or Firm* — Goodwin Procter LLP

(57) ABSTRACT

A system and method for dynamically creating and presenting a network based application for any number of a plurality of products. The method and system upon receiving a request to apply for one or more of a plurality of products, dynamically creates an application pages that includes fields to input the specific information required to apply for the selected products. The application page is provided to the applicant through the network and the application data is received by the system. The method and system causes the application data to be processed and provides the results to the applicant. The applicant is provided the results of multiple specific applications in with minimal data input and in real time.

11 Claims, 3 Drawing Sheets

(56) References Cited

U.S. PATENT DOCUMENTS

| | | | |
|---|---|---|---|
| 4,695,880 A | 9/1987 | Johnson et al. | |
| 4,696,491 A | 9/1987 | Stenger | |
| 4,713,761 A | 12/1987 | Sharpe et al. | |
| 4,725,719 A | 2/1988 | Oncken et al. | |
| 4,736,294 A | 4/1988 | Gill et al. | |
| 4,812,628 A | 3/1989 | Boston et al. | |
| 4,823,264 A | 4/1989 | Deming | |
| 4,831,526 A | 5/1989 | Luchs et al. | |
| 4,866,634 A | 9/1989 | Reboh et al. | |
| 4,882,675 A | 11/1989 | Nichtberger et al. | |
| 4,914,587 A | 4/1990 | Clouse | |
| 4,964,043 A | 10/1990 | Galvin | |
| 4,992,940 A * | 2/1991 | Dworkin | G06Q 10/087 235/383 |
| 5,016,270 A | 5/1991 | Katz | |
| 5,050,207 A | 9/1991 | Hitchcock | |
| 5,054,096 A | 10/1991 | Beizer | |
| 5,084,816 A | 1/1992 | Boese et al. | |
| 5,157,717 A | 10/1992 | Hitchcock | |
| 5,206,803 A | 4/1993 | Vitagliano et al. | |
| 5,220,501 A | 6/1993 | Lawlor et al. | |
| 5,239,462 A | 8/1993 | Jones et al. | |
| 5,262,941 A | 11/1993 | Saladin et al. | |
| 5,265,033 A | 11/1993 | Vajk et al. | |
| 5,274,547 A | 12/1993 | Zoffel et al. | |
| 5,317,683 A | 5/1994 | Hager et al. | |
| 5,321,841 A | 6/1994 | East et al. | |
| 5,351,186 A | 9/1994 | Bullock et al. | |
| 5,412,708 A | 5/1995 | Katz | |
| 5,420,405 A | 5/1995 | Chasek | |
| 5,424,938 A | 6/1995 | Wagner et al. | |
| 5,444,841 A | 8/1995 | Glaser et al. | |
| 5,446,740 A | 8/1995 | Yien et al. | |
| 5,450,537 A | 9/1995 | Hirai et al. | |
| 5,467,269 A | 11/1995 | Flaten | |
| 5,473,143 A | 12/1995 | Vak et al. | |
| 5,473,732 A | 12/1995 | Chang | |
| 5,485,370 A | 1/1996 | Moss et al. | |
| 5,511,117 A | 4/1996 | Zazzera | |
| 5,532,920 A | 7/1996 | Hartrick et al. | |
| 5,537,315 A | 7/1996 | Mitcham | |
| 5,537,473 A | 7/1996 | Saward | |
| 5,544,086 A | 8/1996 | Davis et al. | |
| 5,550,734 A | 8/1996 | Tarter et al. | |
| 5,557,518 A | 9/1996 | Rosen | |
| 5,568,489 A | 10/1996 | Yien et al. | |
| 5,570,465 A | 10/1996 | Tsakanikas | |
| 5,590,197 A | 12/1996 | Chen et al. | |
| 5,592,560 A | 1/1997 | Deaton et al. | |
| 5,594,837 A | 1/1997 | Noyes | |
| 5,598,557 A | 1/1997 | Doner et al. | |
| 5,606,496 A | 2/1997 | D'Agostino | |
| 5,611,052 A | 3/1997 | Dykstra et al. | |
| 5,621,789 A | 4/1997 | McCalmont et al. | |
| 5,621,812 A | 4/1997 | Deaton et al. | |
| 5,625,767 A | 4/1997 | Bartell et al. | |
| 5,634,101 A | 5/1997 | Blau | |
| 5,638,457 A | 6/1997 | Deaton et al. | |
| 5,640,577 A | 6/1997 | Scharmer | |
| 5,644,493 A | 7/1997 | Motai et al. | |
| 5,652,786 A | 7/1997 | Rogers | |
| 5,653,914 A | 8/1997 | Holmes et al. | |
| 5,655,085 A | 8/1997 | Ryan et al. | |
| 5,657,383 A | 8/1997 | Gerber et al. | |
| 5,659,165 A | 8/1997 | Jennings et al. | |
| 5,664,115 A | 9/1997 | Fraser | |
| 5,673,402 A * | 9/1997 | Ryan et al. | 705/38 |
| 5,675,662 A | 10/1997 | Deaton et al. | |
| 5,684,870 A | 11/1997 | Maloney et al. | |
| 5,689,649 A | 11/1997 | Altman et al. | |
| 5,696,907 A | 12/1997 | Tom | |
| 5,699,527 A | 12/1997 | Davidson | |
| 5,710,887 A | 1/1998 | Chelliah et al. | |
| 5,710,889 A | 1/1998 | Clark et al. | |
| 5,727,163 A | 3/1998 | Bezos | |
| 5,734,838 A | 3/1998 | Robinson et al. | |
| 5,740,231 A | 4/1998 | Cohn et al. | |
| 5,742,775 A | 4/1998 | King | |
| 5,754,840 A | 5/1998 | Rivette et al. | |
| 5,758,126 A | 5/1998 | Daniels et al. | |
| 5,758,328 A | 5/1998 | Giovannoli | |
| 5,761,647 A | 6/1998 | Boushy | |
| 5,761,661 A | 6/1998 | Coussens et al. | |
| 5,765,144 A | 6/1998 | Larche et al. | |
| 5,774,122 A | 6/1998 | Kojima et al. | |
| 5,774,882 A | 6/1998 | Keen et al. | |
| 5,778,178 A | 7/1998 | Arunachalam | |
| 5,784,562 A | 7/1998 | Diener | |
| 5,790,650 A | 8/1998 | Dunn et al. | |
| 5,790,785 A | 8/1998 | Klug et al. | |
| 5,793,861 A | 8/1998 | Haigh | |
| 5,794,221 A | 8/1998 | Egendorf | |
| 5,794,259 A | 8/1998 | Kikinis | |
| 5,796,395 A | 8/1998 | de Hond | |
| 5,797,133 A | 8/1998 | Jones et al. | |
| 5,802,498 A | 9/1998 | Comesanas | |
| 5,802,502 A | 9/1998 | Gell et al. | |
| 5,809,478 A | 9/1998 | Greco et al. | |
| 5,815,657 A | 9/1998 | Williams et al. | |
| 5,815,683 A | 9/1998 | Vogler | |
| 5,819,092 A | 10/1998 | Ferguson et al. | |
| 5,819,285 A | 10/1998 | Damico et al. | |
| 5,826,241 A | 10/1998 | Stein et al. | |
| 5,826,245 A | 10/1998 | Sandberg-Diment | |
| 5,826,250 A | 10/1998 | Trefler | |
| 5,832,447 A | 11/1998 | Rieker et al. | |
| 5,832,476 A | 11/1998 | Tada et al. | |
| 5,835,580 A | 11/1998 | Fraser | |
| 5,838,906 A | 11/1998 | Doyle et al. | |
| 5,842,178 A | 11/1998 | Giovannoli | |
| 5,842,211 A | 11/1998 | Horadan et al. | |
| 5,844,553 A | 12/1998 | Hao et al. | |
| 5,845,256 A | 12/1998 | Pescitelli et al. | |
| 5,845,259 A | 12/1998 | West et al. | |
| 5,845,260 A | 12/1998 | Nakano et al. | |
| 5,847,709 A | 12/1998 | Card et al. | |
| 5,848,427 A | 12/1998 | Hyodo | |
| 5,862,223 A | 1/1999 | Walker et al. | |
| 5,870,456 A | 2/1999 | Rogers | |
| 5,870,721 A | 2/1999 | Norris | |
| 5,870,724 A | 2/1999 | Lawlor et al. | |
| 5,873,072 A | 2/1999 | Kight et al. | |
| 5,873,096 A | 2/1999 | Lim et al. | |
| 5,878,403 A | 3/1999 | DeFrancesco et al. | |
| 5,884,288 A | 3/1999 | Chang et al. | |
| 5,889,863 A | 3/1999 | Weber | |
| 5,892,900 A | 4/1999 | Ginter et al. | |
| 5,898,780 A | 4/1999 | Liu et al. | |
| 5,903,881 A | 5/1999 | Schrader et al. | |
| 5,913,202 A | 6/1999 | Motoyama et al. | |
| 5,914,472 A | 6/1999 | Foladare et al. | |
| 5,915,244 A | 6/1999 | Jack et al. | |
| 5,918,214 A | 6/1999 | Perkowski | |
| 5,918,217 A | 6/1999 | Maggioncalda et al. | |
| 5,918,239 A | 6/1999 | Allen et al. | |
| 5,926,800 A | 7/1999 | Baronowski et al. | |
| 5,926,812 A | 7/1999 | Hilsenrath et al. | |
| 5,930,764 A | 7/1999 | Melchione et al. | |
| 5,930,776 A | 7/1999 | Dykstra et al. | |
| 5,933,816 A | 8/1999 | Zeanah et al. | |
| 5,933,817 A | 8/1999 | Hucal | |
| 5,933,823 A | 8/1999 | Cullen et al. | |
| 5,933,827 A | 8/1999 | Cole et al. | |
| 5,940,811 A | 8/1999 | Norris | |
| 5,940,812 A | 8/1999 | Tengel et al. | |
| 5,952,641 A | 9/1999 | Korshun | |
| 5,953,710 A | 9/1999 | Fleming | |
| 5,958,007 A | 9/1999 | Lee et al. | |
| 5,960,411 A | 9/1999 | Hartman et al. | |
| 5,963,952 A | 10/1999 | Smith | |
| 5,963,953 A | 10/1999 | Cram et al. | |
| 5,966,699 A | 10/1999 | Zandi | |
| 5,969,318 A | 10/1999 | Mackenthun | |
| 5,970,482 A | 10/1999 | Pham et al. | |

(56) References Cited

U.S. PATENT DOCUMENTS

| | | | |
|---|---|---|---|
| 5,970,483 A | 10/1999 | Evans | |
| 5,982,370 A | 11/1999 | Kamper | |
| 5,983,206 A | 11/1999 | Oppenheimer | |
| 5,987,436 A | 11/1999 | Halbrook | |
| 5,991,751 A | 11/1999 | Rivette et al. | |
| 5,991,780 A | 11/1999 | Rivette et al. | |
| 5,995,947 A | 11/1999 | Fraser et al. | |
| 5,995,948 A | 11/1999 | Whitford et al. | |
| 5,999,907 A | 12/1999 | Donner | |
| 6,005,939 A | 12/1999 | Fortenberry et al. | |
| 6,012,088 A | 1/2000 | Li et al. | |
| 6,014,636 A | 1/2000 | Reeder | |
| 6,014,638 A | 1/2000 | Burge et al. | |
| 6,014,645 A | 1/2000 | Cunningham | |
| 6,018,714 A | 1/2000 | Risen, Jr. et al. | |
| 6,026,429 A | 2/2000 | Jones et al. | |
| 6,029,149 A | 2/2000 | Dykstra et al. | |
| 6,032,147 A | 2/2000 | Williams et al. | |
| 6,049,835 A | 4/2000 | Gagnon | |
| 6,055,637 A | 4/2000 | Hudson et al. | |
| 6,061,516 A * | 5/2000 | Yoshikawa | G06F 9/4443 717/109 |
| 6,061,665 A | 5/2000 | Bahreman | |
| 6,064,987 A | 5/2000 | Walker et al. | |
| 6,081,810 A | 6/2000 | Rosenzweig et al. | |
| 6,088,683 A | 7/2000 | Jalili | |
| 6,088,686 A | 7/2000 | Walker et al. | |
| 6,088,700 A | 7/2000 | Larsen et al. | |
| 6,098,070 A | 8/2000 | Maxwell | |
| 6,112,181 A | 8/2000 | Shear et al. | |
| 6,125,353 A * | 9/2000 | Yagasaki | G06Q 30/06 705/26.62 |
| 6,131,810 A | 10/2000 | Weiss et al. | |
| 6,134,549 A | 10/2000 | Regnier et al. | |
| 6,144,948 A | 11/2000 | Walker et al. | |
| 6,148,293 A | 11/2000 | King | |
| 6,170,011 B1 | 1/2001 | Macleod Beck et al. | |
| 6,185,242 B1 | 2/2001 | Arthur et al. | |
| 6,189,029 B1 | 2/2001 | Fuerst | |
| 6,195,644 B1 | 2/2001 | Bowie | |
| 6,201,948 B1 | 3/2001 | Cook et al. | |
| 6,202,054 B1 | 3/2001 | Lawlor et al. | |
| 6,298,356 B1 | 10/2001 | Jawahar et al. | |
| 6,385,594 B1 | 5/2002 | Lebda et al. | |
| 6,438,594 B1 | 8/2002 | Bowman-Amuah | |
| 6,493,677 B1 | 12/2002 | von Rosen et al. | |
| 7,831,508 B1 | 11/2010 | Rosko | |
| 8,117,121 B2 | 2/2012 | Rosko | |
| 8,219,802 B2 | 7/2012 | Doleh et al. | |
| 8,266,054 B2 | 9/2012 | Rosko | |
| 2001/0047307 A1 | 11/2001 | Bennett et al. | |
| 2001/0054003 A1 | 12/2001 | Chien et al. | |
| 2002/0010599 A1 | 1/2002 | Levison | |
| 2009/0282239 A1 | 11/2009 | Doleh | |
| 2012/0291141 A1 | 11/2012 | Doleh et al. | |
| 2012/0323761 A1 | 12/2012 | Rosko | |
| 2013/0041796 A1 | 2/2013 | Eggert et al. | |

OTHER PUBLICATIONS

"Car Loans in Minutes," by Anonymous, Bank Management, Apr. 1993, v 69, n 4, p. A23.
"Collections Strategy Model Phase II," Proposal by Mike Alexander et al. of Applied Decision Analysis, Inc., Aug. 7, 1996.
"Competing in Auto Lending," by Phil Britt, America's Community Banker, Nov. 1996, v 5, n 11, pp. 33-37.
"Credit Scoring Digs Deeper Into Data," by marc Friedland, Credit World, May 1995, v 84, n 5, pp. 19-23.
"Expanding Risk Management Strategies: Key to Future Survival," by Ron Jameson, Credit World, v 84, n 5, pp. 16-18.
"Fannie Mae on the Web," by Maize kennedy, Newsbytes, May 8, 1995.
"OFT Gives the Individual Top Priority: Report Calls for Deregulation of Business Lending," by Vanessa Houlder, The Financial Times, Jun. 8, 1994.
"Operations Research," Spring 1975 Bulletin from the Operations Research Society of America, Chicago, IL, Apr. 30-May 2, 1975.
"Scoring Borrower Risk," by Deidre Sullivan, Mortgage Banking, Nov. 1994, v 55, n 2, pp. 94-98.
"There Must Be a Better Way," by Fred Portner, Mortgage Banking, Nov. 1992, v 53, n 2, pp. 12-22.
"Using Software to Soften Big-Time Competition," by Michael Hickman, Bank Systems Technology, Jun. 1994, v 31, n 8, pp. 38-40.
eCharge, eCharge Corporation, www.echarge.com, Dec. 3, 1999.
Tracy Pletz et al., Summary of the at your risk architecture, Jun. 3, 1999.
Siebel, Siebel: Ensuring Customer Success, www.siebel.com, Nov. 17, 1999.
OMG, Welcome to OMG's CORBA for Beginners Page!, www.omg.com, May 25, 1999.
Sun MicroSystems, Inc., Schema for Representing CORBA Objects in an LDAP directory, May 21, 1999.
OMG, Library, www.omg.com, May 25, 1999.
OMG, What is CORBA?, www.omg.com, May 25, 1999.
Overview of CORBA, www.omg.com, May 25, 1999.
JAVA, JAVA™ Technology in the Real World, java.sun.com, May 21, 1999.
JAVA, JAVA™ Servlet API, java.sun.com, May 21, 1999.
JAVA, Staying in Touch with JNDI, java.sun.com, May 21, 1999.
JAVA, JAVA™ Remote Method Invocation (RMI) Interface, java.sun.com, May 21, 1999.
JAVA, Banking on JAVA™ Technology, java.sun.com, May 21, 1999.
JAVA, The JDBC™ Data Access API, java.sun.com, May 21, 1999.
Anne Thomas, Enterprise JAVABEANS™ Technology: Server Component Model for the Java™ platform, java.sun.com, May 21, 1999.
S. R. Hiremath, Numerical Credit Scoring Model, Operations Research Bulletin, WA13.16, Apr. 30, 1975.
Reuters, Getting Smart with Java: Sun Micro Says American Express to Use Java for Smart Card, www.abcnew.go.com/sciences/tech, Jun. 6, 2000.
David Bank, Cash, Check, Charge—What's Next?, Seattle Times, Mar. 6, 1998.
Gerry Vandenengel, Cardson the Internet: Advertising on a $3 Bill, Industry Intelligence, Feb. 1, 1995.
Kim A. Strassel, Dutch Software Concern Experiments with Electronic 'Cash' in Cyberspace, Wall Street Journal, Apr. 17, 1995.
Jeffrey Kutler, Cash Card Creator Looking Beyond Mondex, Feb. 9, 1995.
David Post, E-Cash: Can't Live With it, Can't Live Without it, The American Lawyer, pp. 116-117, Mar. 1, 1996.
Russell Mitchell, Cyberspace: Crafting Software . . . , Business Week, pp. 78-86, Feb. 27, 1995.
Jeffrey Kutler, A Different Drummer on the Data Highway, American Banker, May 12, 1995.
Stephen Eppmt, A pLayer Goes After Big Bucks in Cyberspace, American Banker, May 5, 1995.
Robert Barnham, Network Brings Together Producers and Companies, Bests Review Feb. 1, 1994.
Vanessa Houlder, OFT Gives the Individual Top Priority: Report Calls for Deregulation of Business Lending, The Financial Times, Jun. 8, 1994.
Kennedy Maiz, Fannie Mae on the Web, Newsbyte, May 8, 1995.
Anne Knowles, Improved Internet Security Enabling On-Line Commerce, PC Week, Mar. 20, 1995.
Aversion Therapy: Banks Overcoming Fear of the Net to Develop Safe Internet-based Payment System w/ Netscape Communicator, Network World, Dec. 12, 1994.
Don Clark, Microsoft, Visa to Jointly Develop PC Electronic-Shopping Software, Wall Street Journal, The, B9, Nov. 9, 1994.
Understanding Product Data Management, Hewlett-Packard Company, Apr. 26, 1999.
Getting Started: Specific GE TPN Post Service Use Guidelines, GE, Apr. 26, 1999.

(56) References Cited

OTHER PUBLICATIONS

Resource Center: Consolidated Edison Selects GE TPN Post, GE, Apr. 26, 1999.
ThomasNet, Thomas Publishing Company, Apr. 26, 1999.
SoluSource: For Engineers by Engineers, Thomas Publishing Company, Apr. 26, 1999.
Harris InfoSource, Apr. 26, 1999.
Welcome to MUSE, MUSE Technologies, Apr. 26, 1999.
Product Data Integration Technologies, Inc., PDIT, Apr. 26, 1999.
SBA: Pro-Net, SBA, Apr. 1, 1999.
FreeMarkets, FreeMarkets Online, Inc., Apr. 26, 1999.
Associates National Bank (DE) Credit Card Services, The Associates, www.theassocitheassociates.atescomcom/consumer/credit_cards/rnain.html, Apr. 6, 1999.
At Your Request, Wingspanbankcom, Sep. 28, 1999.
Robyn Meredith, Internet bank moves closer to virtual reality, USA Today, May 5, 1995.
Marvin Sirbu and J.D. Tygar, NetBill: An Internet Commerce System Optimized for Network Delivered Services, http://www.ini.cmu.edu :80/netbill, pp. 1-12, Feb. 27, 1995.
The check is in the email., Information Today, vol. 12, No. 3, Mar. 1, 1995, ISSN: 8755-6286.
The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p. 4241047.
Richard Mitchell, Netlink Goes After an Unbanked Niche, wysiwyg://0/http://www.dialogclassic.com/history, ISSN: 1093-1279, Sep. 1999.

\* cited by examiner

SYSTEM AND METHOD FOR IMPLEMENTING A CONSOLIDATED APPLICATION PROCESS

This application is a continuation of U.S. patent application Ser. No. 13/353,589, filed on Jan. 19, 2012, which is a continuation of U.S. patent application Ser. No. 12/940,186, filed on Nov. 5, 2010, now U.S. Pat. No. 8,117,121, which is a continuation of U.S. patent application Ser. No. 09/599,602, filed on Jun. 23, 2000, now U.S. Pat. No. 7,831,508.

FIELD OF INVENTION

The present invention relates generally to a method that allows customers of a networked service provider to apply for a variety of networked services on one dynamically assembled consolidated application and enables them to receive real time decisioning on their application status for many products.

BACKGROUND OF THE INVENTION

A networked service provider may want to provide its customers with access to a plurality of services, each services having its own, unique application process.

For example, an Internet banking site may wish to provide their customers with a full range of banking services, e.g., opening and maintaining a checking account, applying for a credit card or loan, paying bills, or accessing brokerage or financial planning services. Using the current state of the art, before a customer can utilize these services, the customer must complete a separate application process for each product. Therefore, the customer may be required to complete several applications, often entering the same information, e.g., name, address, telephone and social security number, on multiple applications. This is a significant drawback to the customer. This is also a significant drawback to the Internet banking host because customer dissatisfaction may result in lost accounts. Furthermore, when a customer of a networked service provider completes a service application, application processing may require a significant amount of time. This delay in the application process is a significant drawback.

SUMMARY OF THE INVENTION

An object of the present invention is to overcome this and other drawbacks in the existing systems and methods.

Another object of the invention is to provide customers of a networked service the ability to apply for a variety of services on one consolidated application.

Another object of the invention is to enable customers to receive real time decisioning on the status of their applications.

These and other objects of the invention are accomplished according to various embodiments of the invention. The present invention provides a consolidated application system that comprises a dynamic application module. Users choose one or more services provided through a networked service provider. Then, the dynamic application module presents the customer with a consolidated application, which is partially completed with information that is known about the customer. After the customer completes the blank portions of the application, the dynamic application module sends the application to another server for real-time processing.

In one embodiment, the present invention may comprise a method of enabling customers of an Internet banking service provider to complete applications for particular banking services, where the applications are pre-filled with customers' personal information. Internet banking customers, for example, may utilize a browser system to connect to a host server providing a range of Internet banking services. If the customer wishes to utilize one of the particular services, he or she may select that service. These services may include on-line bill paying, instant credit card applications, loan applications, or checking account services. The customers may have to apply for the selected service(s) by completing an application.

After selecting desired banking services and products, a dynamic application module of the host Internet bank, determines the services for which the customer is applying. The dynamic application module then creates an application page for the customer to complete over the network. The application page contains fields for the customer to provide the information required to apply for each required service. This dynamically created application page allows the customer to apply for many services and products through easily completed and efficient applications process. The dynamic application eliminates duplicate requests for identical information from the customer that is required when the customer completes individual static applications for each product or service.

To further expedite and simplify the application process, the dynamic application module is able to determine whether the customer is logged in as a customer of the host Internet bank. If the customer is logged in, the dynamic application module may contact an e-profile database to retrieve the customer's previously provided personal information. This information may include the customer's name, address, and telephone number. The dynamic application module then fills the particular application with the personal information and then presents the customer with the partially completed application for completion. If the customer is not logged into the host Internet banking site, he or she is presented with a blank application for completion.

After the customer completes the application for the banking service and verifies that the information provided on the application is correct, the application is sent for further processing to approve or decline the application. The customer then receives the status of his or her application.

In the above manner, this application process provides Internet users a method to efficiently apply for products or services and obtain an immediate decision.

DETAILED DESCRIPTION OF THE PREFERRED EMBODIMENTS

For purposes of illustration, a system and method according to an embodiment of the present invention are described below. That system is described as being part of an Internet system that enables customers of an Internet banking service provider to complete applications for particular banking services, where the applications are pre-filled with customers' personal information. The invention is described in terms of an Internet based bank providing a multitude of financial services, some of which are provided by remote providers. However, this embodiment is exemplary only. The invention also finds application in other scenarios requiring customers of a host service provider to complete an application in order to utilize services provided. It should be appreciated that the present invention could be implemented through a variety of networked environments, such as the telephone network, a satellite connection network, or any other system that provides information to a user in a network fashion.

For purposes of clarity and simplicity, the invention is described in terms of the existing Internet. The skilled artisan will recognize that the invention could be implemented in variations thereto, such as the so-called Internet Protocol Next Generation (IPng) or any other variations of networked packet-switch technology.

Figure 1:
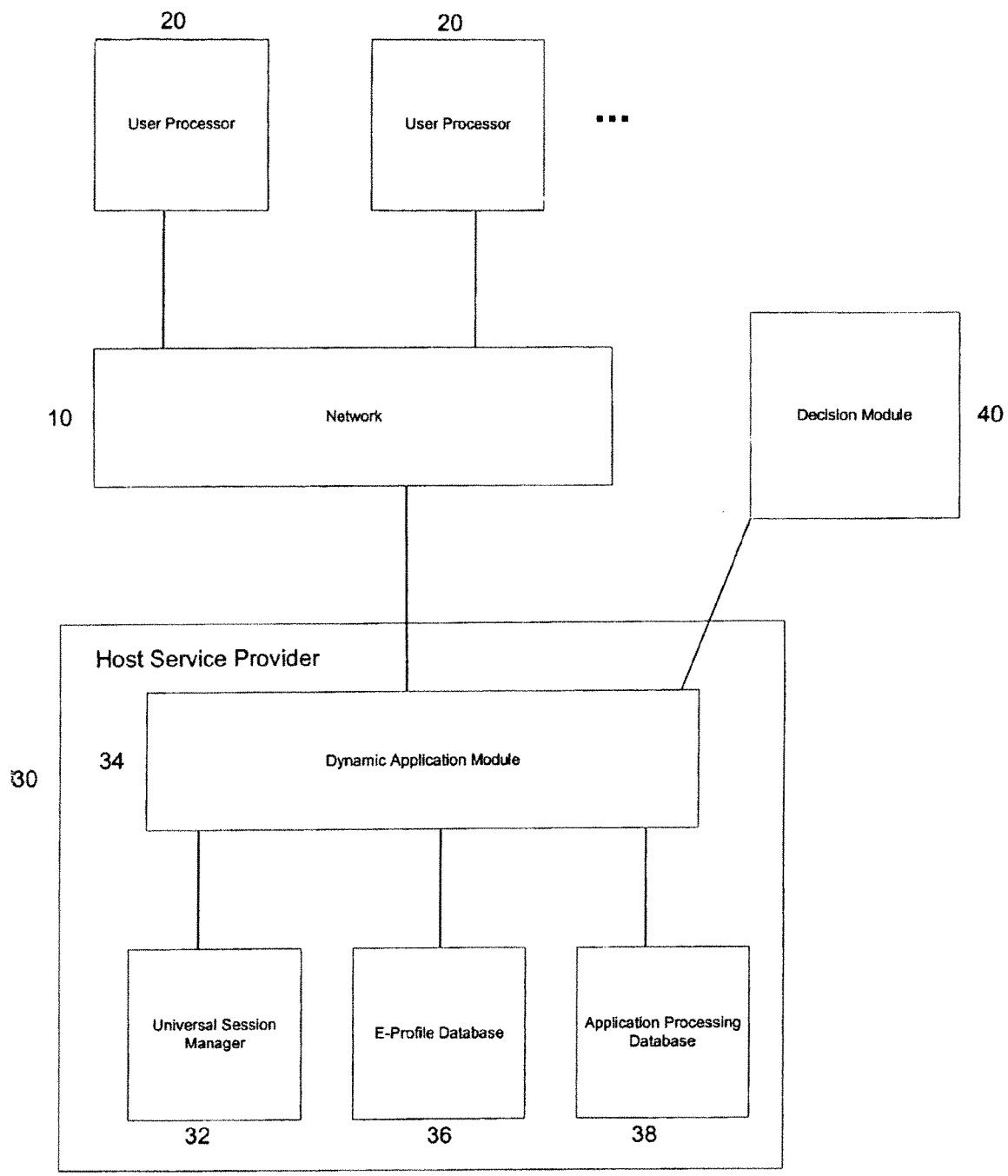
FIG. 1 depicts a schematic diagram of a system according to an embodiment of the invention.

An embodiment of a system for implementing the method disclosed below is depicted in FIG. 1. It should be understood that other embodiments for carrying out the present invention may be provided. In the exemplary embodiment of FIG. 1, a plurality of customers access the dynamic application system through user processors 20 connected using network 10 to a host service provider 30. In the preferred embodiment, the customers connect to an Internet banking service site at host service provider 30. Also in the preferred embodiment network 10 comprises the Internet, although the network may also comprise a cable network, a LAN, a WAN, an intranet, the Supernet, or any other network that allows transmission of data. The user processors 20 are local computers including Internet browser modules.

The host service provider 30 is a server on which resides the software interface to the Internet bank. The host service provider comprises a plurality of modules that function to perform the functions described above in addition to other functions including those set forth below. Although separate modules are described for performing these functions, it should be noted and understood that additional modules may also be provided and that modules may be combined.

According to the preferred embodiment of the invention, host service provider 30 includes a universal session manager 32, a dynamic application module 34, an e-profile database 36, and an application processing database 38.

The dynamic application module 34 is a software package that provides customer applications to the bank's products and services. The dynamic application module 34 interacts with the universal session manager 32. The universal session manager is a program to manage customer data and security while interacting with the host service provider 30. When an existing customer is logged in to the universal session manager, previously provided stored information regarding the customer is made accessible. The dynamic application module 34 interacts with the universal session manager 32 to gain access to this information that may be used during the application process to automatically fill certain application fields. The dynamic application module 34 retrieves this information from the e-profile database 36. The e-profile database 36 is a database that contains information regarding existing customers. The application processing database 38 is a database that stores information regarding an applicant's application process. Such information may include the length of the application process, whether the application was ultimately submitted and the ultimate decision on the application. The dynamic application module 36 interacts with the application processing database by providing data regarding the application process.

Approval of the application is accomplished through an decision module 40. Decision module 40 is a processor dedicated to receiving an applicant's data and determining whether the applicant meets the requirements for receiving credit. Decision module 40 may reside outside the host service provider 30 and may receive applicant data from multiple sources. The dynamic application module 34 provides applicant data to the decision module 40 and also receives the results of application determination from decision module 40. The dynamic application module 34 is constructed to receive application data from a customer's user processor 20 through network 10 and to format this data for transmission to decision module 40.

Figure 2A:
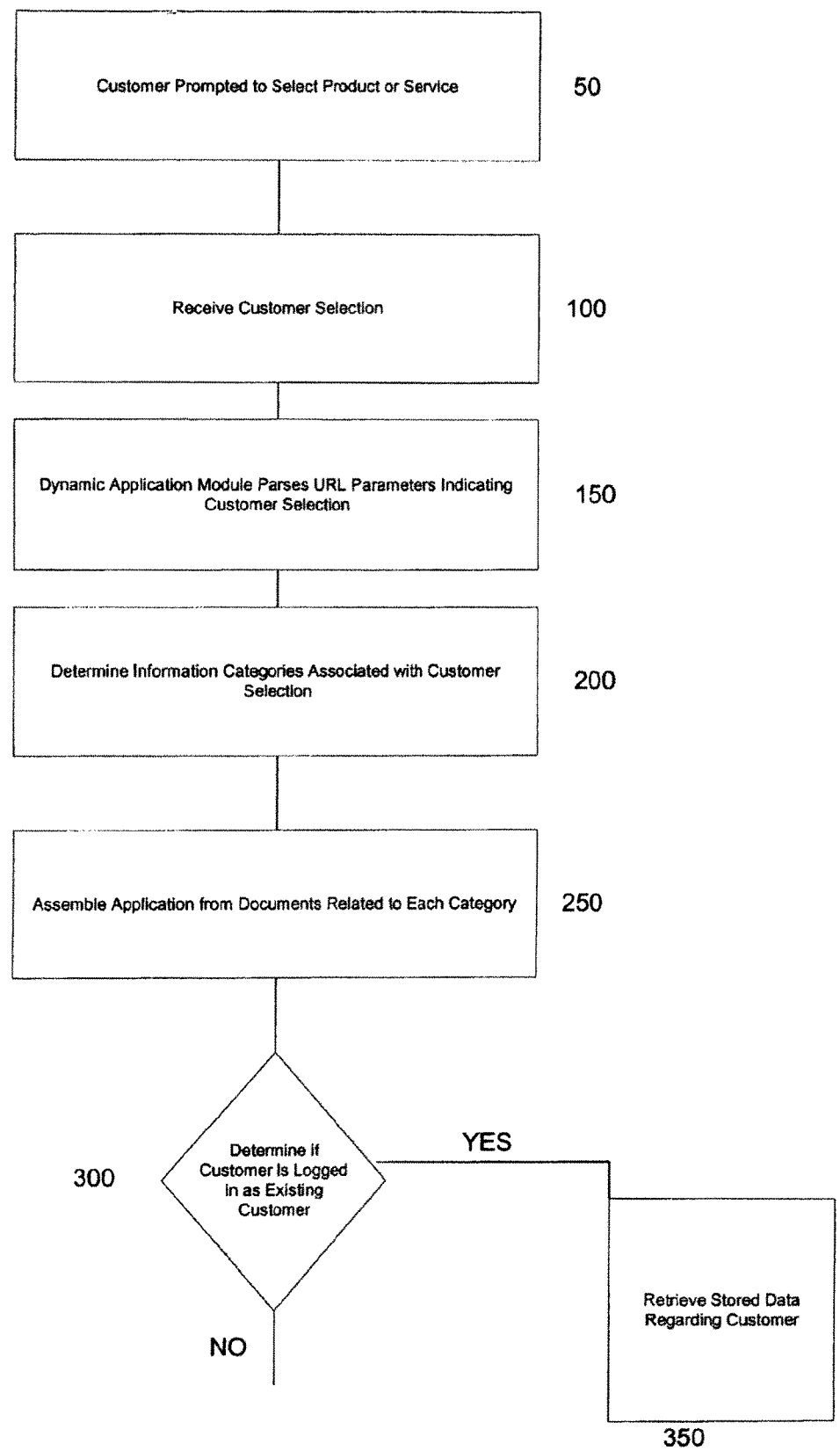
FIGS. 2A and 2B depict a flow diagram illustrating a method according to an embodiment of the present invention.
Figure 2B:
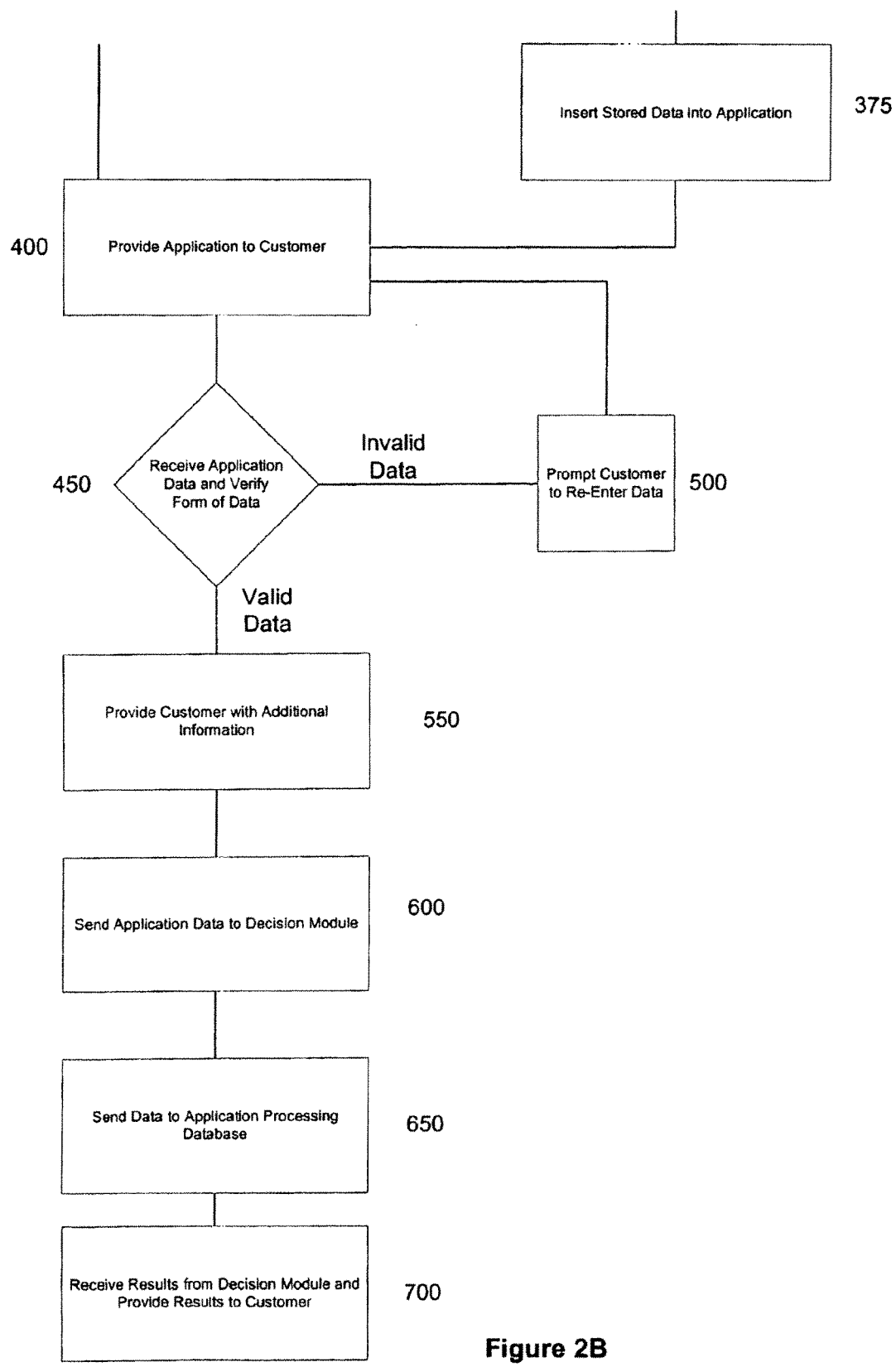

The preferred embodiment of the method of dynamically creating an application page and receiving an application from a customer is described below. Referring now to FIGS. 2A and 2B, the preferred method executed by the system shown in FIG. 1 is depicted. In step 50, a customer is prompted to apply for products or services offered by the provider. The prompt may be included in a web page provided by the host service provider 30 at the request of the customer. The prompt may also take the form of an advertisement or other link to the Internet bank site. In step 100, the customer of an internet bank selects one or more internet banking products and services. The host service provider 30 may comprise a server system connected over the World Wide Web or Internet 10 to provide web-pages upon request from one or more users utilizing a web browser on user processor 20. Accordingly, step 100 may comprise a customer connected to a web site of an Internet banking service provider and utilizing the browser on user processor 20 to select a service provided through that web site. This selection may occur through a page or pages provided by the bank that allows the customer to select multiple products from an extensive list of available products. The term products is used herein to refer to products and services. In this Internet bank example, the products include credit cards accounts, checking accounts (and overdraft protection), loans, investment accounts, certificates of deposit, etc. The selection may also occur though an advertisement or other presentation that provides a link to the dynamic application module 34. In the later case, the customer may not have the opportunity to chose from among all the products and services supported by the dynamic application module 34. The dynamic application module receives the customer selections from each of the various customer entry points and processes each request according the products and services selected by the customer.

In step 150, the dynamic application module receives the customer selection. In the preferred embodiment, the customer selection is received in the form of a uniform resource locator (URL) that is directed to the dynamic application module 34 and includes parameters that indicate which services or products the customers desires to apply for. The dynamic application module 34 parses the received URL to identify the products and services selected by the customer.

In step 200, the dynamic application module determines the categories of information required to apply for the services and products identified in the receiving step 150. Each product and service supported by the dynamic application system is associated with the categories of information required to apply for the product or service. For example, the customer may desire to apply for both a checking account and a credit card. After identifying that the customer has selected a checking account and a credit card in step 150, the dynamic application module determines the categories of information required to apply for both a checking account and a credit card. This may include, for example, information generic to all applications such as name, address, employer, income, housing, etc. Other categories may include information specific for application for the checking account or the credit card account. For example, application for the checking account may include information regarding whether overdraft protection is desired. Application for the credit card may include information regarding whether the customer wishes to transfer balances from other credit cards. Other categories of information may apply to multiple but not all services or products. For example, application for both the checking account and the credit account may include information regarding whether the customer desires a second user to have access to the accounts. This information may not be required if the customer is applying to purchase a certificate of deposit. Thus in the current example where the customer has selected to apply for both a checking account and a credit card account, the dynamic application module would determine that a general information category, a second authorized user category, a overdraft category, and a balance transfer category of information is required.

In step 250, an application page is assembled that requests the information for each of the categories determined to be required in step 200. Each category of information has a corresponding associated HTML document. The document for each category includes objects permitting the customer to enter the required information. These objects may include text fields, buttons, image fields, checkboxes, radio buttons, list/menus, etc. The dynamic application module 34 dynamically assembles the HTML documents associated with each required category of information into an application page. The application page thus includes all the objects required to gather all the information to apply for each product or service selected by the customer. However, no information is requested multiple times from the customer regardless of the number of services or products selected.

In step 300, the dynamic application module interacts with the universal session manager 32 to determine if the customer is logged in as an existing customer. The dynamic application module 34 performs a HTTP redirect to the universal session manager 32 to determine if the customer is logged in. If the customer is logged in, the universal session manager 32 performs a redirect back to the dynamic application module 34 with a parameter appended to the URL identifying the customer. If the customer is not logged in, the redirect back to the application module includes no customer identification parameter. If the customer is an existing customer that has logged into the system, then in step 350 the dynamic application module 34 interacts with the e-profile database 36 to retrieve stored information regarding the customer. The customer identification parameter received from the universal session manager 32 is provided to the e-profile database 36 and stored data regarding the customer is returned to the dynamic application module 34. The dynamic application module 34 inserts this information into the appropriate objects in the application page at step 375. For example, the customer name is pre-inserted into a name text field in the application page.

The customer is then provided the application in step 400. If the customer has logged in as an existing customer, then a partially pre-filled application page is provide from step 375. If the customer has not logged in, a blank application form is provided. The application form may be provided as a direct reaction to the URL received in step 150. The application may alternatively be provided after customer has been provided with additional pages, which may provide addition disclosure or instructions. A Secured Socket Layer (SSL) channel is initiated once the customer selection is received and all data requested by the application is encrypted, preferably using 128 bit encryption.

After the customer completes the application, the customer indicates that the information should be sent to the Internet Bank. At this point the customer input information is verified at step 450 to ensure that is in the proper form and meets certain minimum standards. This verification step may verify that all required information has been provided by the customer. The verification step may also verify that the form of the information provided is correct. The information provided by the customer may be validated by comparison to acceptable field types, maximum length, minimum length, etc. For example, the verification step may ensure that the customer has provided a LIP code and may also verify that the data input is a valid ZIP code or in the form of a valid ZIP code. If the information input by the customer is not in the proper form a page is displayed requesting that the customer enter valid information. If the information is verified in step 450, then the information is accepted by the dynamic application module.

Upon accepting the application information from the customer, the dynamic application module causes the information to be formatted and sent to the decision module 40, as shown in step 600. The decision module 40 returns an application locator key to the dynamic application module upon receiving and saving the application information. After the customer has indicated that the input information is to be sent to the Internet Bank, the customer may be provided in step 550 with additional disclosure regarding the products and services selected. The system may provide other messages or advertisements at this time. The dynamic application module 34 also logs information regarding the application process. This information may includes data such as the time the application was provided to the customer, the time the completed application was received, if the completed application was received, and other information regarding the application process. This information is sent to the application processing database in step 650.

The dynamic application module 34 requests the results of the application processing from the decision module with the application locator key as shown in step 700. These results are provided to the customer promptly in an appropriate form by the dynamic application module 34. As this process is entirely automated, the results can be provided in approximately one minute of submitting the application data. The results cover all of the products the customer may desire. If the customer application for any product or service is approved, the dynamic application module requests further identifying information. Upon receiving the further information the dynamic application module 34 provides the customer with a link to an enrollment module. If not approved the customer may be provided with information regarding further review of the application and future contact by the bank.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A computer-implemented system dynamically creating a network based application form and receiving an application including multiple products or services offered by a single entity, the system including:

a memory storing instructions;
a host server having at least one computer processor accessing the memory and executing the stored instructions, thereby performing steps including;
  receiving a request from a customer computing system applying for at least two of a plurality of products or services offered by the entity, wherein the request is in the form of parameters received within a universal resource locator, the request received over a network at the host server, wherein specific categories of information are required to be submitted to apply for each one of the plurality of products or services available through the entity;
  dynamically assembling, using a dynamic application module, in response to the request, an application page and displaying the application page over the network, the assembly including:
    determining the categories of information required to apply for the plurality of products, wherein determining the categories of information includes identifying categories of generic information common to all products and identifying remaining categories of specific information required to apply for the requested products;
    locating a file corresponding to each category of information identified from a plurality of files;
    combining the located files, using the dynamic application module, thereby creating the application page in response to the request, such that fields for each located file are included in the application page only once, thus avoiding duplicative requests for information to the customer;
    determining, using the dynamic application module, whether the customer is logged in to a session manager, accessing stored data regarding the customer from an e-profile database when the customer is logged in and inserting the stored data, thereby completing fields of the application page displayed over the network; and
    receiving information over the network at the host server from the customer computing system corresponding to each uncompleted field contained in the application page.

2. The system of claim 1, further including the steps of:
validating, using the dynamic application module, the information input by comparing the information input to validation criteria; and
when the information input fails to correctly compare to the validation criteria, assembling, using the dynamic application module, a second application page including prompts to reenter information and receiving correction information input.

3. The system of claim 1, further including the step of forwarding, using the dynamic application module, the information input to a decision module processing the information input.

4. The system of claim 1, wherein the plurality of products or services includes banking products or services and the specific information required to apply for one of the plurality of products or services includes information regarding an amount of credit to be extended.

5. The system of claim 4, further including the step of forwarding the information input, using the dynamic application module, to a decision module processing the information input to determine when data input justifies extension of credit.

6. A computer-implemented system dynamically creating a network based application form in order to receive an application including multiple products or services offered by a single entity, the system including:
a memory storing instructions;
a host server having at least one computer processor accessing the memory and executing the stored instructions, thereby performing steps including;
  receiving, over a network at the host server, a request to apply for at least two of a plurality of products or services in the form of a uniform resource locator, wherein specific categories of information are required to be submitted to apply for each one of the plurality of products or services;
  parsing the uniform resource locator thereby identifying the at least one of a plurality of products or services;
  dynamically assembling an application page using a dynamic application module implemented by the processor at the host server and displaying the application page over the network, the assembly including:
    determining the categories of information required to apply for the plurality of products, wherein determining the categories of information includes identifying categories of generic information common to all products and identifying remaining categories of specific information required to apply for the requested products;
    locating a file corresponding to each category of information from a plurality of files;
    combining the located files, thereby creating the application page;
    determining, using the dynamic application module, whether the request to apply originates from a customer that is logged in to a session manager;
    accessing stored data regarding the customer from an e-profile database when the customer is logged in, wherein the step of assembling an application page includes inserting the stored data in the application page displayed over the network; and
    receiving, over the network at the host server, information input corresponding to each field contained in the application page.

7. The system of claim 6, wherein the assembly includes:
combining the located files using the dynamic application module, thereby creating the application page in response to the request, such that a field for each located file is included in the application page only once, thus avoiding duplicative requests for information to the customer.

8. The system of claim 6, further including the steps of:
validating, using the dynamic application module, the information input by comparing the information input to validation criteria; and
when the information input fails to correctly compare to the validation criteria, assembling, using the dynamic application module, a second application page including prompts to reenter information and receiving correction information input.

9. The system of claim 6, further including the step of forwarding, using the dynamic application module, the information input to a decision module processing the information input.

10. The system of claim 6, wherein the plurality of products or services includes banking products or services and the specific information required to apply for one of the plurality of products or services include information regarding an amount of credit to be extended.

11. The system of claim 6, further including the step of forwarding the information input, using the dynamic application module, to a decision module processing the information input to determine when data input justifies extension of credit.

\* \* \* \* \*